United States Patent [19]

Warshawsky et al.

[11] 4,154,674

[45] May 15, 1979

[54] PROCESS FOR REMOVING CONSTITUENTS FROM A MIXTURE

[75] Inventors: Abraham Warshawsky, Rehovot; Abraham Patchornik, New Ziona; Rami Kalir, Rehovot, all of Israel

[73] Assignee: Yeda Research & Development Co., Ltd., Rehovot, Israel

[21] Appl. No.: 817,808

[22] Filed: Jul. 21, 1977

[30] Foreign Application Priority Data

Jul. 25, 1976 [IL] Israel ........................................ 50122

[51] Int. Cl.$^2$ ............................................. B01D 15/08
[52] U.S. Cl. ........................................ 210/32; 210/36; 210/37 R; 210/38 B; 210/38 C
[58] Field of Search ................... 210/24, 30 R, 32, 36, 210/38 B, 38 C, 21, 37 R, 37 B, 38 R, 38 A; 260/2.2 R, 611 B; 526/55

[56] References Cited

U.S. PATENT DOCUMENTS

| | | | |
|---|---|---|---|
| 3,931,123 | 1/1976 | Vacik et al. | 210/38 B |
| 4,025,641 | 5/1977 | Schaub et al. | 260/611 B |

FOREIGN PATENT DOCUMENTS

46-34984 10/1971 Japan ........................................ 526/55

OTHER PUBLICATIONS

Smid, J. et al., "Cation Binding Properties of Poly(Vinyl Macrocyclic Polyethers)", Chem. Abs. 75:49824j.
Kopolow et al., "Interactions of Ions and Ion Pairs with Crown Ethers and Their Polymers", Chem. Abs. 79:19292z.
Wong et al., "Binding of Organic Solutes to Poly(-Crown Ethers) in Water", Chem. Abs. 87:118519a.
Flett, D., "Resin Impregnates: The Current Position", *Chemistry and Industry*, Aug. 6, 1977, pp. 641-646.
Sano et al., "Solid-Phase Method for Peptide Synthesis Using Macroreticular Copolymers", *Biochim. Biophys. Acta*, 244 (1971), pp. 201-205.
Kun et al., "Pore Structure of Some Macrorecticular Ion Exchange Resins", *J. Polymer Sci.*, vol. 2, (1964), pp. 587-591 & 839.
Tuemmler et al., "Noncyclic Crown-Type Polyethers, Pyridophane Cryptands, and Their Alkali Metal Ion Complexes: Synthesis, Complex Stability, and Kinetics", Chem. Abs. 87:1336196.

*Primary Examiner*—Charles N. Hart
*Assistant Examiner*—Ivars Cintins
*Attorney, Agent, or Firm*—Browdy & Neimark

[57] ABSTRACT

The present process causes selective removal of a predetermined anionic or cationic constituent from a mixture containing a plurality of constituents by contacting the mixture with an extraction agent so as to remove the desired constituent from the mixture, and if desired eluting the constituent from the extraction agent, thus recovering the extracting agent for further use. The extraction agent has the general formula

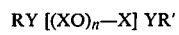

RY [(XO)$_n$—X] YR' wherein X is a group (CH$_2$—CH$_2$) or (CH$_2$—CHR$^1$) where R$^1$ is alkyl, aryl or a non-interfering functional substituent, n is an integer between 2 and 100 which defines the molecular weight of the glycol or glycol derivative, and wherein R and R', which may be identical or different, each designates:

(a) R and R' are hydrocarbon groups selected from alkyl, aryl and aralkyl;
(b) R and R' are as defined in (a), one at least of R and R' being a group

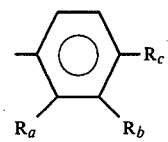

wherein R$_a$ is a non-interfering substitutent;
R$_b$ is —H, —OH, —COR$_d$, CR$_d$NOH, —NO$_2$m —COOH, halogen or a non-interfering substituent,
R$_c$ is —OH or —SH,
R$_d$ is —H, alkyl, aralkyl
(c) R and R' are [X'], X' being a group

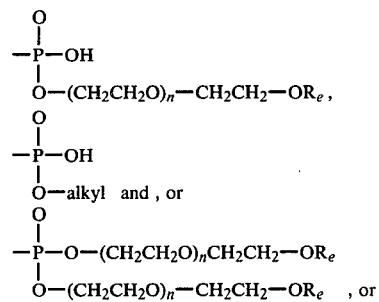

(d) R and R' designate a polymeric backbone or a group as defined under (a), (b) or (c), above at least one of R and R' being a polymeric backbone, and Y is O or —NH.

12 Claims, No Drawings

PROCESS FOR REMOVING CONSTITUENTS FROM A MIXTURE

The present invention relates to a novel process for the extraction and removal of selected metal cations and of other predetermined constituents of various mixtures and especially to the selective removal of certain predetermined metal values from solutions containing these in admixture with other metal cations. The present invention also comprises a process for the selective extraction of certain anionic constituents. Furthermore, the present invention provides novel extracting agents which are characterized by their specificity for various cationic or anionic components of systems containing a mixture of constituents. Other and further aspects of the invention will become apparent hereinafter.

The extractants to be used in the process of the present invention are based on the use of certain polyoxyalkenes, such as polyethylene glycol (PEG) and polypropylene glycol (PPG), and of modifications, and functional derivatives of these, as defined hereinafter.

STATE OF THE PRIOR ART

Polyethers as polyethylene glycol (PEG) and polypropylene glycol (PPG) have found widespread use in various fields of technology, such as:

(a) Adsorbants in respirators, C.A. 66, P490497;
(b) Purification of natural gas, C.A. 75, P199799f;
(c) Antifreeze agents, C.A. 75, P119866a;
(d) Antioxidants, C.A. 67, P4510n, 68, P18241t;
(e) Explosive slurries, C.A. 66, P4576C;
(f) Extraction of boric acid, C.A. 73, P59684m;
(g) Rocket fuel, C.A. 67, P83539;
(h) Catalysts for photographic development, C.A. 66, P70879.

Only a limited number of macropolyethers has been described in literature. Amongst these there may be mentioned polyphenylene oxide (PPO) which is used in the production of ion-separation membranes and which is of the general formula

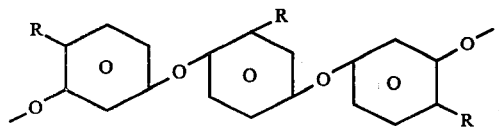

wherein R designates alkyl.

Another polymer, which is the reaction product of quaternary ammonium or quaternary sulfonium resins and sugars is described in U.S. Pat. No. 3,197,281 of Dow Chemical Co.

The extraction agents of the present invention are based on polyoxyalkenes, and preferred embodiments of these are polyoxyalkene glycols. The invention is illustrated with reference to polyoxyethylene glycol and polyoxypropylene glycol, and to certain derivatives and modified forms of these, as defined hereinafter. It is clear that other polyoxyalkylene glycols and similar derivatives and modified forms thereof can be used as well.

Some of the extracting agents used in the process of the present invention are known compounds, while certain derivatives of these and certain modified forms thereof are novel compositions of matter and as such form part of the present invention.

The extraction agents of the present invention can be defined with reference to the general formula

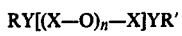

$$RY[(X{-}O)_n{-}X]YR'$$

wherein n is an integer, which defines the molecular weight of the glycol or glycol derivative, and which is between 2 and 100, and preferably between 2 and 20, and Y is either oxygen or nitrogen. wherein R and R', which may be identical or different, define the class of the compound, and which is one of the following alternatives:

(1) R and R' are hydrocarbon groups, such as alkyl, aryl or aralkyl, of up to about 15 carbon atoms. The compounds are oil-soluble. These are known compounds.

(2) R and R' are moieties characterized by a specific affinity for certain values which are to be preferentially extracted, such as for example metal values such as copper, uranium, gold, etc. These compounds are also oil-soluble, and these are novel compounds.

(3) At least one of R and R' designates a polymeric species, and in this case the product has all the hydrophilic properties of the $-(XO)_nX-$ group, combined with the properties of the polymeric backbone; wherein X defines a group $-(CH_2{-}CH_2)$ or $-(CH_2{-}CHR^1)$ wherein $R^1$ is alkyl, aryl or a non-interfering group. In polypropylene this stands for methyl.

According to the above, the extraction agents of the present invention can be grouped in three main classes, defined as above, classes 1 to 3 respectively.

In class 1, the terminal groups are $-OR$ or $OR'$ groups, wherein R and R' are simple hydrocarbon groups, such as alkyl, aryl or aralkyl, of up to about 15 carbon atoms in each such group;

In class 2, the terminal groups are $-OR^*$ or $-OR'$ groups, wherein $OR'$ is as in class 1, or $-H$ and $-OR^*$ designates a group

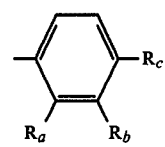

wherein
$R_a$ is a non-interfering substituent, or $R_a$ forms with $R_b$ a cyclic group;
$R_b$ is $-H$, $-OH$, $-COR_d$, $-CR_dNOH$, $-COOH$, halogen or any other non-interfering substituent;
$R_c$ is $-OH$ or $-SH$, The novel compounds of the invention of class 2 also comprise compounds wherein the terminal groups are different. Specific compounds of this group are those wherein $-R'$ is hydrogen or alkyl and $R^*$ is selected from:

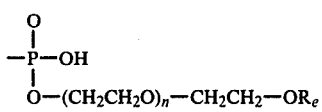

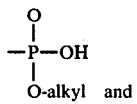

O-alkyl and

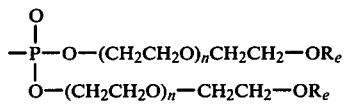

wherein $R_e$ designates alkyl, aryl or aralkyl, and compounds wherein R' is —H, alkyl or aryl and R* is a phenyl group which may be substituted as above, or both —R' and R* may be such substituted phenyl groups.

In class 3, there are compositions of matter wherein the polyoxyalkylene moieties are attached to a polymeric backbone via one or both of the terminal groups of said polyoxyalkylene moieties. This results in solid compositions of matter, and in these the polymers of choice are polystyrene or copolymers of styrene with other monomers. such as for example with divinyl benzene. Of particular use there are macroporous polymers such as Amberlyte Xe-305. The polymer can be in any suitable physical shape, such as bead shape or the like. There may be used linear polystyrenes, cross-linked polystyrenes such as gel-type polystyrenes, cross-linked macroporous polystyrene. The polyoxyalkylene moieties fulfill the functions as sequestering and extraction agents and as these are attached to a polymeric backbone, the separation processes are facilitated. The products obtained with macroporous polystyrene retain the porosity of the starting material, and they also have the characteristic properties of the polyoxyalkylene groups, such as their hydrophilicity. If only one terminal group is attached to Re polymeric backbone, other Re can be a group as defined in class 1 or 2.

Many compounds of Class 1, i.e. compounds wherein R and R' are alkyl aryl or aralkyl, are known from literature and these are obtained by conventional alkylation and arylation reactions of polyoxyalkylenes. Most of these are liquids which are freely soluble in hydrocarbons and in most organic solvents; they are practically insoluble in water. Most of these have a certain affinity for given cations, and they are capable of dissolving these and transferring them by solvent extraction to a suitable organic phase. As example there may be mentioned the extraction of gold chloride from aqueous solutions by means of dibutylpolyoxypropylene glycol of M.W.=425 in toluene.

Class 1 compounds are generally hydrophilic and they may be physically absorbed on a suitable polymeric carrier, such as for example on hydrophobic macroporous polystyrene.

Many of the substituted benzene derivatives of the class 2 compounds are known compounds. The products obtained when these are attached as terminal groups of polyoxyalkylene compounds are novel compositions of matter and as such form part of this invention. The preparation of these is analogous to the preparation of class 1 compounds.

The process of preparation of the compounds of Class 2 can be set out schematically as follows:

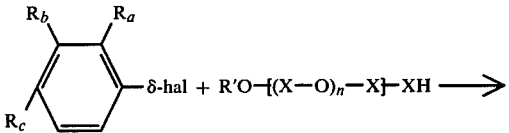

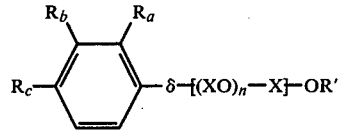

where $\delta$ is —CH$_2$— or —SO$_2$—; hal is chlorine or bromine. In the case of PEG and PPG the reaction proceeds at about 120° C. to 180° C. When alkali metal salts of PEG or PPG are used elevated temperatures are not required. Phosphorous compounds are prepared by reacting phosphorus oxychloride with excess of PEG or PPG to yield respectively the triesters or there may be carried out a reaction with dichloromethoxy-phosphate to produce diesters:

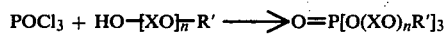

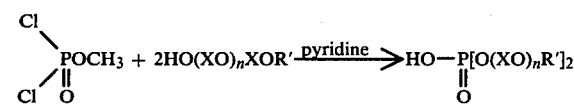

Some specific compounds of Class 2 are of the following formulas:

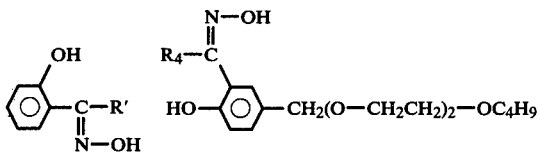

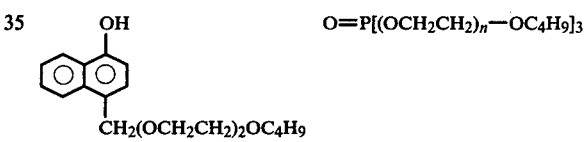

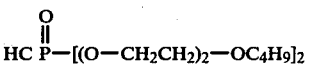

Compounds of Class 2 are liquids or solids at ambient temperature. They are easily soluble in most organic solvents, including hydrocarbons. They are nearly insoluble in water. They are hydrophilic and can be used effectively as liquid/liquid extraction agents. They can also be used effectively when they are absorbed on solid supports. Class 3 compounds can be prepared using polystyrene or polystyrene copolymers as backbone. They are prepared by reacting a chloromethyl or chlorosulfonyl polystyrene and a sodium salt of PEG or PPG,

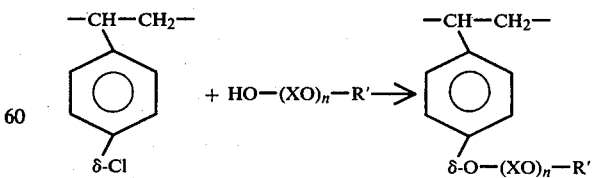

where $\delta$ is —CH$_2$— or —SO$_2$— In a similar manner the chloromethylated or chlorosulfonated polymer may be partially substituted by groups of the type —O—[(X-O)$_n$X]OR where X and R are as defined above, while other chlormethyl groups or chlorosulfonyl groups are reacted to give tert-amino or —SO₃H groups respectively or similar substituents, resulting in a polymeric backbone carrying different substituents, only part of these being as defined above. The compounds of Class 3 are solids. When they are based on a backbone of porous polystyrene, they retain the porosity of the starting material, and these are combined with the hydrophilic characteristics of the polyoxyalkylene chain. These compounds are able, due to their nucleophilic properties, to dissolve compounds such as bromine, chlorine, sulfur trioxide and they are capable of adsorbing large aromatic molecules such as arylphenol oximes. Thus, they are suited for the removal of atmospheric contaminants and of pollutions from aqueous media.

When, for example, a hydrophobic copper extractant is immobilized, this can be used as solid ion exchanger to recover copper values. Similarly, uranium can be recovered. Solid polyether extracts of this class are very efficient acid scavengers from solvents having a low dielectric constant, (LDS) releasing these into solvents having a high dielectric constant (HDS), the mechanism being as follows:

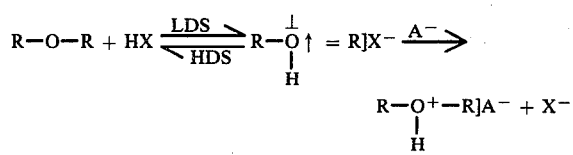

Acids formed during reactions can be effectively removed by means of such compounds and these can be afterwards regenerated by washing with water. Amongst acids bound by such polyethers there are also Lewis acids, such as BF₃ and AlCl₃. The same mechanism can be utilized for the removal of metal cations from highly acidic solutions. Protonated polyethers are highly efficient anion exchangers. This type of reaction can be exemplified with reference to the removal of iron from phosphoric acid and by the removal of gold from hydrochloric acid:

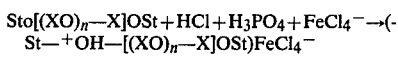

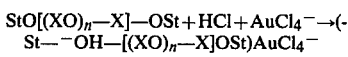

wherein St designates polystyrene and X is as defined above. The metal is selectively extracted and it can be removed from the polymeric reagent by washing this with water, whereby the reagent is also regenerated for further use. Polyether reagents of Class 3 are capable of complexing certain metals by a mechanism which differs from the anion ion-exchange mechanism. For example, mercury, gold and other metals are complexed by polyether extractants from neutral to slightly acid solutions (pH of from 7 to about 3.0).

In Table I there is given a list of commercially available polyglycols which can be used as starting compounds in the preparation of extraction agents according to the present invention. The following Examples, which are to be constructed in an illustrative and not in a limitative manner, exemplify the preparation of extraction agents according to the present invention, and some of the uses of these. As pointed out above, compounds of Class 2 and Class 3 are novel compounds and compositions of matter, and as such are part of the present invention. As regards Class 1 compounds, the application of these for extractions as set out in the following is novel and part of the present invention.

Table 1.

Commercially Available Polyglycols

| Materials | Molecular Weight (N.W.) | Catalogue | Number |
|---|---|---|---|
| Polypropylene glycols | 180 | Fluka | — |
| Polypropylene glycols | 425 | Fluka | 81360 |
| Polypropylene glycols | 700 | Fluka | — |
| Polypropylene glycols | 1200 | Fluka | 81370 |
| Polypropylene glycols | 2000 | Fluka | 81380 |
| Polytetrahydrofuran | — | Polyscience | 4366 |
| Polytetramethyleneoxide | — | Polyscience | 4366 |
| Polyethylene glycols | 200 | Fluka | 81150 |
| Polyethylene glycols | 300 | Fluka | 81160 |
| Polyethylene glycols | 400 | Fluka | 81170 |
| Polyethylene glycols | 600 | Fluka | 81180 |
| Polyethylene glycols | 1000 | Fluka | 81190 |
| Polyethylene glycols | 1500 | Fluka | 81210 |
| Polyethylene glycols | 4000 | Fluka | 81240 |
| Polyethylene glycols | 6000 | Fluka | 81260 |
| Polyethylene glycols | 20000 | Fluka | 81300 |
| Polyethylvinylether | — | Polyscience | 3032 |
| Poly-iso-butylvinylether | — | Polyscience | 2564 |
| Polyethyleneglycolmonomethylether | — | Polyscience | 0626 |
| $NH_2-CH(CH_3)-CH_2-(O-CH(CH_3)-CH_2)_a-(O-CH_2-CH_2)_b-(O-CH_2-CH(CH_3))_c-NH_2$ | — | Jefferson | Jeffamine-ED |
| $NH_2-CH(CH_3)-CH_2(O-CH_2-CH(CH_3))-NH_2$ | — | Jefferson | Jeffamine-D |

Taken from: Polysciences Catalogue (Paul Valley Industrial Park, Warrington, Pa., 1976, USA) and Fluka Catalogue.

EXAMPLE 1

Preparation of Dibutylpolyethyleneglycol 3.5 g of sodium was dissolved in 160 ml of polyethyleneglycol (M.W. 600), 40 g of butyl bromide added dropwise and the mixture kept at 100° C. for 24 hours. The product was distributed between chloroform and water. The organic phase was washed with water, dried, and excess solvent removed, to yield 100 g of dibutylpolyethyleneglycol (M.W. 600) as oil.

EXAMPLE 2

Preparation of Dibutylpolypropylene glycol 3.5 g of sodium was dissolved in 100 ml of polypropylene glycol (M.W. 425) and 40 g of butylbromide was added dropwise. The mixture was kept at 100° C. for 24 hours. The product was distributed between chloroform and water, dried, and R excess of solvent was removed, to yield 140 g of dibutylpolypropylene glycol. (M.W. 425) as oil.

EXAMPLE 3

Preparation of n-Butyl (3-formyl-4-hydroxyphenylmethyl) diethylene glycol

4-Chloromethylsalicylaldehyde (17 g=0.1 mole) was reacted with diethyleneglycol mono-n-butyl-ether (200 ml), 150° C. for 24 hours. Excess of solvent was distilled off under vacuum and the residue was washed with water, to yield 32 g of product. The ketone was reacted with 14 g (0.2 mole) of hydroxylamine hydrochloride in 100 ml methanol at 64° C. for 20 hours, then washed with water to yield 30 g of the oxime (4.0%N) as oil.

EXAMPLE 4

Preparation of n-Butyl-(3-acetyl-4-hydroxyphenylmethyl) diethyleneglycol and its oxime 4-Chloromethyl-2-acetylphenol (19 g-0.1 mole) was reacted with diethylene glycol mono-n-butyl ether (200 ml), 150° C. for 24 hours. The excess solvent was distilled off under vacuum, and the residue was washed with water to yield 34 g product, which was converted to the corresponding oxime by reaction with 14 g (0.2 mole) NH$_4$OH.HCl, in 100 ml methanol to yield: 33 g (3.2%N) the oxime as oil.

EXAMPLE 5

Preparation of n-Butyl-(-3-formyl-4-hydroxyphenylmethyl) polypropylene glycol and its oxime 4-Chloromethylsalicylaldehyde (17.0 g=0.1 mole) was reacted with polypropylene glycol of (molecular weight 425) mono-n-butyl ether (45.7 g=0.1 mole) in 100 ml diglyme at 150° for 20 hours. The product, was dissolved in chloroform, and the solution washed with water, then reacted with 14 g NH$_2$OH-HCl in 200 ml methanol to yield 60 g of the corresponding oxime (2.3%N) as oil.

EXAMPLE 6

Preparation of n-Butyl-(3-acetyl-4-hydroxyphenylmethyl) poly ethyleneglycol and its oxime 4-Chloromethyl-2-acetylphenol (19 g=0.1 mole) was reacted with 200 ml polyethylene glycol (M.W. 400) mono-n-butyl ether at 150° C. for 24 hours. The product was dissolved in 200 ml chloroform and washed thoroughly with water. The ketone was now converted to the oxime by reaction with 14 g NH$_2$OH.HCl in 100 ml methanol at reflux for 20 hours. The product was washed with water to yield the corresponding oxime (2.2%N) as oil.

EXAMPLE 7

Preparation of n-Butyl-(8-hydroxylquinoline-5-methyl) poly ethyleneglycol

5-Chloromethyl-8-hydroxyquinoline (23 g=0.1 mole) was reacted with diethylene glycol mono-n-butyl ether (M.W. 400) at 150° C. for 20 hours. Excess of solvent was removed under vacuo and the residue dissolved in chloroform and washed several times with water to yield oxime (3.2%N) as oil.

EXAMPLE 8

Preparation of Tris-(n-butyl-diethyleneglycol) phosphate

To a solution of 31.3 g (0.18 mole) of the sodium salt of diethyleneglycol monobutyl ether in 100 ml dry dioxane, there was added at 5°-10° C. at slow rate (2 hours) 5.15 g (0.05 mole) of phosphoroxychloride (POCl$_3$) in 50 ml absolute dioxane. The mixture was left at room temperature for 20 hours, the excess dioxane distilled off, under vacuum, and the residue washed with water to yield 30.5 g of an oily product containing 5.8% P.

EXAMPLE 9

Preparation of di-(n-butyldiethylene glycol) phosphoric acid

Methyldichlorophosphate (25 ml, 0,250 mole) was added to anhydrous pyridine (100 ml) in a dry box. After 15 minutes a solution of diethyleneglycol monobutylether (81 g, 0.5 mole) was added dropwise during 2 hours, and the mixture was left for 16 hours. Water was added (500 ml), and the mixture extracted with ether. The ether was evaporated to yield 92 g of an oily viscous product (8.5% P).

EXAMPLE 10

Preparation of (Xe-305—CH$_2$)—O—CH$_2$—CH$_2$—O—CH$_2$—CH$_2$—O—(CH$_2$Xe-305)

1 g of sodium was dissolved in 25 ml of diethyleneglycolmonobutylether (MBC) and 5 g of chloromethylated polystyrene (Xe-305 type, Rohm & Haas, 20% Cl) was added. The mixture was left at 100° C. for 20 hours, filtered, washed with methanol, water, methanol and ether. The dried solid product weighed 6.9 g, and contained 5.6% Cl, indicating 1.7 mole of MBC groups per gram of polymer. In this example and in the following ones the underlined designates the polymer backbone.

EXAMPLE 11

Preparation of (Xe-305—CH$_2$) O—CH$_2$—CH$_2$—O—CH$_2$—CH$_2$—O—C$_4$H$_9$ 1 g of sodium was dissolved in 25 ml of diethyleneglycolmonobutyl-ether (MBC) and 5 g of chloromethylated styrene-8% divinylbenzene copolymer (of microporous type) was converted to 5.8 g of solid of 4.3% chlorine content, (7.7% chlorine in starting polymer), indicating 0.75 moles of MBC groups per gram of polymer.

EXAMPLE 12

Preparation of
(Xe-305—CH$_2$—)—O—(—CH$_2$—CHCH$_3$—O)$_8$C-H$_2$—CHCH$_3$—O—(CH$_2$Xe-305)

1.8 g of sodium was dissolved in 75 ml polypropylene glycol (M.W. 425) and 10 g of chloromethylated polystyrene (Xe-305 type) was added. The mixture was kept 100° C. for 20 hours and treated as in Example 1, to yield 18.8 g of a solid of 1.5% chlorine content, indicating 1.32 mole of PPG units per gram of polymer.

EXAMPLE 13

Preparation of
(Xe-305—CH$_2$—)O(CH$_2$—CHCH$_3$—O)$_{20}$—CH$_2$—CHCH$_3$—O(CH$_2$Xe-305)

0.3 g of sodium dissolved in 25 ml polypropylene glycol (PPG) (M.W. 1200), 1.5 g of chloromethylated polystyrene (20%, Xe-305 type) was added, and the mixture, was kept at 100° C. for 20 hours. The workup gave 2.3 g of solid, containing 10.3% Cl, indicating 0.31 mole of PPG 1200 units per gram of polymer.

EXAMPLE 14

Preparation for
(Xe-305—CH$_2$)—O(CH$_2$—CH$_2$—O)$_{10}$—CH$_2$—CHCH$_3$O (CH$_2$—Xe-305)

Sodium hydride suspended in paraffin oil (4 g) was washed several times with dry dioxane to remove the hydrocarbon, and then added to a solution of 150 g polyethyleneglycol M.W. 600 dissolved in 350 ml dry dioxane, cooled to 5° C. After completion of the dissolution, there were added 21 g of chloromethylpolystyrene Xe-305 swollen in 75 ml dry dioxane and rinsed with 75 ml more dry dioxane. The mixture was kept at 90°–100° C. for 24 hours, then cooled and solvent removed by filtration. The solid polymer was washed with 1.1 MeOH/water, then MeOH and ether. Yield 43 g. The sodium hydride suspension in oil 50-60%, as supplied by Fluka-Switzerland is used in many of the preparations of Class 3. The quantities listed are gms of sodium hydride in suspension.

EXAMPLE 15

Preparation of
(XAD-2—CH$_2$)—O—(CH$_2$—CH$_2$—O)$_8$—CH$_2$CH$_2$—O—(CH$_2$XAD-2)

Sodium hydride suspended in paraffin oil (6 g) was washed several times with dry dioxane to remove the hydrocarbon, and then added to a solution of 50 g polyethyleneglycol M.W. 400 dissolved in 250 ml dry dioxane, cooled at 5° C. After completion of the dissolution, there were added 10 g of chloromethyl polystyrene type XAD-2 swollen in 75 ml dry dioxane and rinsed with 75 ml more dry dioxane. The mixture was kept at 90°–100° C. for 24 hours, then cooled and solvent removed by filtration. The solid polymer was washed with 1:1 MeOH/water, then MeOH and ether. Yield 15.6 g.

EXAMPLE 16

Preparation of
(XAD-2—CH$_2$)—O—(CH$_2$—CH$_2$O)$_5$—CH$_2$—CH$_2$—O(CH$_2$XAD-2)

Sodium hydride suspended in paraffin oil (6 g) was washed several times with dry dioxane to remove the hydrocarbon, and then added to a solution of 25 g polyethyleneglycol M.W. 200 dissolved in 250 ml dry dioxane, cooled to 5° C. After completion of the dissolution, there were added 10 g of chloromethyl polystyrene (XAD-2) swollen in 75 ml dry dioxane and rinsed with 75 ml more dry dioxane. The mixture was kept at 90°–100° C. for 24 hours, then cooled, and solvent removed by filtration. The solid polymer was washed with 1:1 MeOH/water, then MeOH and water. Yield: 15.5 g.

EXAMPLE 17

Preparation of
(Xe-305—CH$_2$)—O—(CH$_2$—CH$_2$—O)$_{100}$CH$_2$—CH$_2$—O(—CH$_2$—Xe-305)

Sodium hydride suspended in paraffin oil (6 g) was washed several times with dry dioxane to remove the hydrocarbon, and then added to a solution of 75 g polyethyleneglycol M.W. 6000 dissolved in 250 ml dry dioxane, cooled to 5° C. After completion of the dissolution, there were added 10 g of chloromethyl polystyrene (Xe-305) swollen in 75 ml dry dioxane and rinsed with 75 ml more dry dioxane. The mixture was kept at 90°–100° C. for 24 hours, then cooled and solvent removed by filtration. The solid polymer was washed with 1:1 MeOH/water, then MeOH and ether. Yield: 16.8 g.

EXAMPLE 18

Preparation of
(Xe-305—CH$_2$—)O(—CH$_2$CH$_2$—O)$_{10}$—CH$_2$—CH$_2$—O(—CH$_2$Xe-305) CH$_2$—N(C$_2$H$_5$)$_2$ Sodium hydride suspended in paraffin oil (6 g) was washed several times with dry dioxane to remove the hydrocarbon, and then added to a solution of 15 g polyethyleneglycol M.W. 600 dissolved in 250 ml dry dioxane, cooled to 5° C. After completion of the dissolution there were added 10 g of chloromethyl polystyrene (Xe-305) swollen in 75 ml dry dioxane and rinsed with 75 ml more dry dioxane. The mixture was kept at 90°–100° C. for 24 hours, then cooled and solvent removed by filtration. The polymer was washed with 1:1 MeOH/water, then MeOH and ether. Yield 11.3 g containing 12.5% Cl. The polymer was reacted in 30 ml CHCl$_3$ with 5 g diethylamine at 60° C. for 20 hours. The solid polymer was filtered and washed with CHCl$_3$ and dried. Obtained: 11.0 g of product containing 2.0 equivalents of nitrogen per gram of polymer.

EXAMPLE 19

3.5 gr of sodium was dissolved in 100 ml diethyleneglycol (carbitol). 40 gr of hexylbromide was added dropwise and the mixture kept at 100° C. for 24 hours. The product was distributed between chloroform and water, dried and excess solvent removed to yield 130 gr of dihexyl carbitol as oil.

EXAMPLE 20

Sodium hydride suspended in paraffin oil (6 g) was washed several times with dry dioxane to remove the hydrocarbon, and then added to a solution of 15 g polystyrene oxide M.W. 700, dissolved in 250 ml dry dioxane, cooled to 5° C. After completion of the dissolution, there were added 10 g of chloromethyl polystyrene (Xe-305) swollen in 75 ml dry dioxane and rinsed with 75 ml more dry dioxane. The mixture was kept at 90°–100° C. for 24 hours, then cooled and solvent removed by filtration. The polymer was washed with 1:1 MeOH/water, then MeOH and ether. Yield: 12.30 g containing 2.5% Cl.

EXAMPLE 21

Sodium hydride suspended in paraffin oil (6 g) was washed several times with dry dioxane to remove the hydrocarbon, and then added to a solution of 15 g polystyrene oxide M.W. 6700 dissolved in 250 ml dry dioxane, cooled to 5° C. After completion of the dissolution, there were added 10 g of chloromethyl polystyrene (Xe-305) swollen in 75 ml dry dioxane and rinsed with 75 ml more dry dioxane. The mixture was kept at 90°–100° C. for 24 hours, then cooled and solvent removed by filtration. The polymer was washed with 1:1 MeOH/water, then MeOH and ether. Yield: 12.3 g containing 2.5% Cl.

EXAMPLE 22

Adsorption of Bromine 3 g of the polymer of Example 14 was cooled in a beaker to 0°–5° C., and chilled liquid bromine was added slowly, until no more adsorption occurred. The temperature was not allowed to rise above 5° C. during the addition period. After the addition, air was bubbled through the polymer to evaporate the excess of unadsorbed bromine. After a month of shelf storage the polymer weighed 3 g indicated a bromine take-up capacity of 6.8 mmole/gram polymer. The bromine could be released from the polymer by washing it with water or with most organic solvents in which the polymer is insoluble.

EXAMPLE 23

Extraction of Iron from Acidic Solutions

Extraction of iron from mixed chloride/phosphate acidic solutions was tested. The chloride concentration ranged from 100–300 g/l, and the phosphate concentration ranged between 10–500 g/l. In a typical experiment 10 g of the polymer of Example 14 was packed in a column of 2.2 cm diameter and 15 cm length, 400 ml of a solution containing 1.8 g/l Fe, 34.2 g/l P and 300 g/l Cl was passed through. The analysis of the outcoming solution was as follows: 0.087 g/l Fe and 335 g/l P indicating 98% recovery of phosphorous and removal of 95% of the iron. A second on a freshly prepared column reduced the iron concentration to 0.004 g/l (99.8% iron removal). The rate of adsorption on the polymer was next tested from the same solution. The dependence of iron concentration in solution on time of contact with the polymer is shown below:

| Contact Time: (min.) | 0 | 10 | 28 | 110 |
|---|---|---|---|---|
| Conc. (mg/l) | 33.8 | 7.2 | 3 | 1.3 |

EXAMPLE 24

Extraction of Gold from Chloride Solution

Equilibrium adsorption of $Au^{III}$ on polymers of Examples 12 and 14 expressed as loading capacity (mg $Au^{III}$ per gram polymer) from various acid concentrations is given below:

| HCl concentration (N) | 0.1 | 0.5 | 1 | 3 | 5 |
|---|---|---|---|---|---|
| Loading Capacity for Polymers Ex. 12 | 23 | 27 | 25 | 41 | 99 |
| Loading Capacity for Polymers Ex. 14 | 105 | 105 | 103 | 155 | 160 |

The rate of adsorption on polymer CU/5 from 3 N hydrochloric acid containing 0.4 g/l of $Au^{III}$ is given below:

| Time (min.): | 0 | 17 | 32 | 87 |
|---|---|---|---|---|
| Concentration in solution (ppm) | 1700 | 730 | 520 | 140 |

The gold could be simply eluted from polymer of example 14 by washing with water.

In a typical experiment a column of 10 g polymer of example 12 was prepared, and 200 ml of 0.5 mg/ml $Au^{III}$ in 0.1 N HCl was passed, the 97 mg gold were collected on the resin. 30 ml of water were passed and the outgoing solution contained 1.89 mg Au/ml.

EXAMPLE 25

Extraction of gold with liquids

Dibutylpolypropyleneglycol (M.W. 425) of Example 2 was used. The maximum capacity of this solvent for the extraction of gold from chloride solutions is given:

| HCl Concentration (N): | 0.1 | 1 | 3 | 6 |
|---|---|---|---|---|
| mg Au/g reagent: | 12 | 90 | 194 | 282 |

In a typical experiment, 282 mg of gold were extracted by 1 ml reagent upon contact with water (3×1 ml) 95% of the gold was recovered in the eluant.

EXAMPLE 26

Extraction of mercury

Equilibrium concentration of $Hg^{II}$ on polymers of Examples 12 and 14 is given below (as mg Hg/gr polymer):

| HCl concentration (N) | 0.1 | 0.2 | 2 | 5 |
|---|---|---|---|---|
| (for polymer of Ex. 12) Loading capacity | 52 | 38 | 45 | 56 |
| Loading capacity for polymer of Ex. 14 | 34 | 16 | — | 39 |

In a typical experiment a column containing 20 g of the polymer of Ex. 12 was prepared, and 200 ml of 1 mg/ml $HgCl_2$ in 5 N HCl was passed through 1096 mg of Hg were trapped by the column, 100 ml of acetone were passed through and 960 mg of mercury analyzed in the obtained solution.

EXAMPLE 27

Separation of iron from copper 900 ml of a solution containing 0.7 g/liter $Fe^{III}$, and 14.28 g/liter $Cu^{II}$ in 6 N HCl was passed through 20 gr of the polymer of Ex. 14 packed in a column, at a rate of 2.5 ml/min. The loading capacity of the polymer 405 mg Fe. In the eluant the Cu concentration is 14.28 g/l (unchanged) the Fe was eluted with 100 ml $H_2O$ to yield 406.1 mg Fe.

EXAMPLE 28

Adsorption of Acids

The following examples demonstrate that the polyether compounds of the invention are capable of quantitative recovery of mineral and organic acids. The acids are recovered by washing the polymer with water or alternatively with polar organic solvents such as methanol or acetone (in the following examples meq=milliequivalents).

| a) Polymer used: Example 14: | Adsorption of Hydrochloric acid. | | | |
|---|---|---|---|---|
| HCl (N) | 0.1 | 1 | 3 | 6 |
| Polymer capacity (meq/gr) | 0 | 0 | 1.1 | 3.5 |

In a typical experiment 76.5 ml of 6 N HCl (459 meq HCl) were passed through 17.5 g of polymer. 416.6 meq were captured by the polymer and 417 meq were released by elution with 50 ml $H_2O$.

(b) Adsorption of sulfuric acid from water 300 ml of 6 N $H_2SO_4$ passed through 20 g polymer at a rate of 0.5 ml/min and 306.6 meq were captured. 300 ml $H_2O$ at a rate of 3 ml/min, recovered 296 meq of acid.

EXAMPLE 29

Trifluoroacetic acid (TFA) in chloroform 800 ml of 0.56 N TFA in $CHCl_3$ were passed through 17.5 g polymer of Example 14 at a rate of 0.4 ml/min. 219.5 meq of acid were captured. 300 ml methanol eluted 165.3 meq of TFA and 45 meq of methyltrifluoroacetate.

EXAMPLE 30

Boron trifluoride in chloroform 1100 ml of 0.16 N boron trifluoride etherate in chloroform was passed through 20 g polymer of example 14 in a column at a rate of 0.8 ml/min. 55.75 meq of $BF_3$ were captured. 300 ml methanol eluted 52.21 meq $BF_3$.

EXAMPLE 31

TFA in dioxane 400 ml of 0.68 N TFA in dioxane passed through 10 g polymer of Example 14. 210 meq of TFA were captured.

EXAMPLE 32

HBr in Chloroform 50 ml of 0.78 N HBr in $CHCl_3$ were passed through 2 g polymer of Example 14. 18.4 meq. HBr were captured.

EXAMPLE 33

HBr in dioxane 50 ml of 0.8 n HBr in dioxane were passed through 2 g polymer of Example 14. 6 meq of HBr were captured.

EXAMPLE 34

HBr in benzene 50 ml of 0.67 N HBr in $C_6H_6$ were passed through 2 g polymer of Example 14. 21.6 meq were captured.

The preceding examples 28 to 34 indicate that acids may be recovered efficiently from organic solvents. It should be clear that the acid carrying polyethers may be used for different purposes, such as acid catalysts, and synthetic reactions, such as hydrochlorination, hydrobromination, alkylations, acylations, hydroxylation etherification, and other reactions.

EXAMPLE 35

Liquid extraction

The novel ether-oxime reagents of Examples 3 to 7 are excellent phase transfer reagents. As polyoxyethylene or polyoxypropylene are very good surfactants, they increase the ability of the ether oximes to transfer metal cations across the interphase boundary, without affecting the selectivity of the oxime group. In the following experiments, a solution of the reagent of example 3 in toluene was prepared. 100 ml of such a solution was mixed in a separatory funnel with an equal volume of the metal containing solution for one minute at 200 rpm. The layers were separated, and the aqueous solution analyzed. In the stripping experiments, the organic layer was washed with pH 4.0 $H_2SO_4$ then mixed with 100 ml of the acid solution, which was analyzed for its copper content.

| (a): | Copper capacity as function of pH. | | | | |
|---|---|---|---|---|---|
| Reagent: 0.0031 M Ex. 3 in toluene. | | | | | |
| pH: | 0.8 | 1.0 | 1.04 | 1.8 | 4.0 |
| % extraction: | 20 | 45 | 50 | 98 | 100 |

(b) Loading capacity of 0.1 M solution of Ex. 3 in toluene containing between 1–10 gpl $Cu^{II}$.

Copper solution at pH 2–4 continuing between 1–10 gpl $Cu^{II}$. Loading capacity: 3 gpl in the organic phase.

(c) Copper recovery from loaded organic phase (stripping).

Starting solutions: 0.01 mole Ex. 3 and 0.005 mole copper per liter toluene and 1 N or 2 N or 3 N $H_2SO_4$ contact time per stage: 1 minute.

| $H_2SO_4$ | 1 | 2 | 3 |
|---|---|---|---|
| copper recovery after one contact | 92 | 98.5 | 99 |
| copper recovery after two contacts | 98 | 100 | 100 |

(d) Selectivity for copper over the cations

It is known that other trivalent and divalent cations tend to complex with phenolic oxime of the Lix-64N[R] type. It was suggested that the selectivity for copper is only kinetic.

The novel ether-oxime reagents offer a remarkable selectivity for copper. No nickel or zinc ions are picked up by the reagents. Iron is picked up to a very small degree but only in the absolute absence of copper. The iron complex, whenever formed, is exchanged by copper.

EXAMPLE 36

Applications of Class 1 and Class 2 compounds, adsorbed on Various Polymers as solvent impregnated resins (SIR)

The absorption capacity of various polymers was determined by slowly adding a solvent, such as methylene chloride, to a known amount of the polymer, until exhaustion of the adsorption capacity was noted.

Table II

| Polymer | ml $CH_2Cl_2$ adsorbed per gram polymer |
|---|---|
| Amberlite XAD-1 | 2.7 |
| Amberlite XAD-2 | 1.8 |
| Amberlite XAD-4 | 2.8 |
| Amberlite Xe-305 - Polyethylene glycol - 600 - Example 14 | 3.6 |
| Amberlite Xe-305 - Polypropylene glycol - 425 - Example 12 | 4.00 |

The SIR polymers were prepared by two methods: (a) The wet impregnation procedures, and (b) the dry impregnation procedure.

(a) The wet Impregnation Procedure: The desired amount of the reagent was dissolved in methylene chloride and the polymer was added. The resins obtained were conditioned by adding an excess of the metal salt containing solution. After an hour the excess free reagent was washed away by extraction with hot water in a soxhlet apparatus (30°–50° C.) for 2 days. The resins were packed into columns, and their properties examined.

(b) The Dry Impregnation Procedure: In this method only Class 2 reagents could be used; alternatively, hydrophobic reagents as Lix-64N could be used if a modifier, chosen from Class 1 was added. In the cited examples polypropylene-glycol of average molecular weight 425 blocked in both terminals by n-butyl groups as described in Class 1, Example 2 was used.

When a modifier was used, dry removal of solvent by a slow evaporation under vacuum at 80° C. was applied.

The preparation of various SIR (Solvent Impregnated Resins) polymers by the dry and wet methods, is demonostrated below.

EXAMPLE 37

Application of SIR Polymers

The advantages of the SIR reagents described above is demonstrated by their extraction of metals. All columns were rinsed with 2 N $H_2SO_4$ to remove any metal present and then washed with water to pH 7.0.

(a) SIR, Application I: Adsorption of Copper

In all experiments a 3.0 g/liter $Cu^{II}$ (as $CuSO_4$) solution of pH 4.0 was passed through columns containing 20 g of polymer. The polymers used contained 1 mmole of oxime groups per gram Amberlite XAD-2. The loading capacity was determined by analysis of the barren solutions and agreed well with results obtained from elution with 1 N $H_2SO_4$.

Table III

| | | | | mg Cu adsorbed per 20 gr polymer | | |
|---|---|---|---|---|---|---|
| No. | Copper Extraction Reagent | Origin | Polymer | Dry Method | Wet Method | Dry + 15% Modifier |
| 1 | LiX-64N | General Mills | XAD-2 | 50 | 475 | 492 |
| 2 | $CH_3-\bigcirc-CH_2-\bigcirc-OH$ with $C=N-OH$ group | Yeda File T/254 | XAD-2 | 99 | 561 | 603 |
| 3 | $CH_2-\bigcirc-OH$ with $C=N-OH$ and $OCH_2-CH_2-O-CH_2-CH_2-C_4H_9$ | Ex. 3 | XAD-2 | 540 | 530 | — |
| 4 | Lix-64$^N$ | General Mills | Ex. 14 | 450 | 143 | — |

Table III shows the advantage of using the modifiers and the advantage of the wet method for the hydrophobic reagents Lix-64N and reagent no. 2 in that higher extraction of copper is obtained. It shows also that polyether oximes, represented by reagent No. 3 can be impregnated by any method described in this invention. It is also obvious that hydrophobic reagents like Lix 64N may be impregnated on polymeric polyethers of Class 3.

EXAMPLE 38

Separation of Copper

The main advantage of the reagent is its capability to separate $Cu^{II}$ from $Fe^{III}$. This is achieved successfully at various Cu concentrations and Cu/Fe ratios. The following SIR reagents (containing one mole reagent per kg polymer were tested): (For reagents description see Table III).

Reagent 2 on XAD-2
Reagent 2 on XAD-4
Reagent 2 on polyether Example 14
Reagent 3 on XAD-2
Reagent 3 on XAD-4
Reagent 3 on polyether Example 14

In a typical experiment 20 g of SIR polymer were packed in a column, and the copper iron solution of pH 2.0 was passed at a rate of 0.5 ml/min. After exhaustion a solution of sulphuric acid of pH 4.0 was passed, and the metals eluted with IN $H_2SO_4$. The selectivity factor is calculated by the ratio Cu/Fe on the resin.

The results of a typical experiment (IM reagent Example 3 (on XAD-2) is given in Table IV. Similar results were obtained with all SIR resins for copper.

Table IV:

| $Cu^{II}$ concentration (g/l) at pH 2. | Selectivity Cu/Fe molar ratio | Selectivity | | |
|---|---|---|---|---|
| | | Cu/Ni | Cu/Fe | Cu/Zn |
| 1.5 | 1:1 | >500 | 93 | 500 |
| 3.0 | 1:1 | >500 | 452 | 500 |
| 15.0 | 10:1 | >500 | 150 | 500 |

The conclusion is that very favorable selectivities are obtained throughout the range of practical concentration and Fe/Cu ratios.

EXAMPLE 39

Elution Efficiencies

Quantitative and fast elution is necessary to ensure a repeated use of the polymer. The elution from the polymers was even faster than the adsorbtion and was achieved with 1 N sulphuric acid. In comparison the stripping of Lix-64 N in kerosene is obtained only with 2-3 N $H_2SO_4$. The elution efficiency XAD-2 containing 1 M of reagent and using equal polymer and 1 N $H_2SO_4$ is described in Table V.

Table V:

| Reagent | Elution Efficiency | | |
|---|---|---|---|
| | Method | mg Cu adsorbed | Mg Cu eluted |
| Lix-64N | Dry | 40 | 5 |
| Lix 64N | Modifier | 200 | 197 |
| 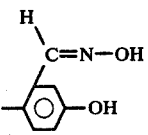 | Wet | 540 | 537 |
| Class 3 - Ex. 6 | | 330 | 325 |

Similar results were obtained with other SIR resins.

EXAMPLE 40

Rate of Complexation and Decomplexation

One of the major advantages of the products of this invention is the fast kinetics of both the adsorbtion and elution stages.

In all the experiments 20 g of polymers containing 1 m mole of reagent per gram resin (prepared by the Wet Method) were contacted with 200 ml of a 2.0 gpl $Cu^{II}$ (as $CuSO_4$) of pH 4.0 and aliquots were withdrawn at certain times and analyzed for their copper content. The half life time ($t_{1/2}$) for absorbtion and elution are given below:

Table VI:

| | | Half Life Values | | |
|---|---|---|---|---|
| | | | $t_{1/2}$ (min) | |
| Reagent | Polymer | 15% Modifier | adsorbtion | Elution |
| 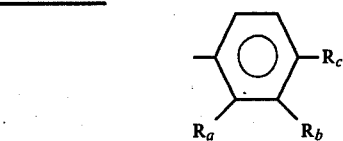 | XAD-2 | — | 5 | 1.5 |
| " | XAD-4 | — | 8 | 2 |
| " | Xe-305-PEG-600 (ex 14) | — | 3 | 4 |
| " | XAD-4 | + | 3 | 4 |
| Example 3 | XAD-4 (ex. 14) | — | 5 | 2 |
| Example 3 | Xe-305-PEG-600 | — | 5 | 1 |
| Example 4 | XAD-2 | — | 4 | 4 |
| Example 4 | XAD-4 | — | 3 | 3 |
| Lix-64N | XAD-4 | — | 8 | 4 |
| Lix-64N | Xe-305 PEG-600 (ex. 14) | — | 2 | 4 |
| Lix-64N | XAD-4 | — | 140 | 180 |

We claim:

1. A process for the selective removal of a predetermined anionic or cationic constituent from a mixture containing a plurality of constituents, comprising contacting the mixture with an extracting agent of the general formula $$RY\ [(XO)_n\text{-}X]\ YR'$$

so as to remove the desired constituent from the said mixture, wherein, in the general formula, Y is O or —NH, X is a group ($CH_2$—$CH_2$) or ($CH_2$—$CHR^1$) where R' is alkyl, aryl or a non-interfering functional constituent, n is an integer between 2 and 100 which defines the molecular weight of the glycol or glycol derivative, and R and R', which may be identical or different, each designates:

(a) R and R' are hydrocarbon groups selected from alkyl, aryl and aralkyl;

(b) R and R' are as defined in (a), one at least of R and R' being a group

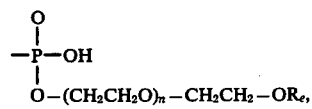

wherein $R_a$ is a non-interfering substituent,
$R_b$ is —H, —OH, —$COR_d$, $CR_dNOH$, —$NO_2$, —COOH, halogen or a non-interfering substituent, wherein $R_d$ is —H, alkyl or aralkyl, and
$R_c$ is —OH or —SH;

(c) R and R' are the group

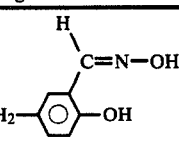

or

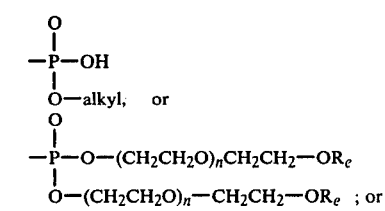

(d) R and R' designate a polymeric backbone or a group as defined under (a), (b) or (c), above, at least one of R and R' being a polymeric backbone.

2. A process according to claim 1, wherein the extraction agent is dialkylpolyethyleneglycol or dialkylpolypropylene glycol and the extracted species is gold which is extracted from a hydrochloric acid solution.

3. A process according to claim 2 wherein the extracted species is eluted with water.

4. A process according to claim 1, wherein the extraction agent is a polyethylene glycol or polypropylene glycol attached by one or both of its terminal groups to a macroporous polystyrene, and if only one of these terminal groups is attached to a polystrene, the other terminal group is an ether group -OR, wherein R is alkyl, and wherein the extracted species is iron from acidic solutions; gold from chloride solutions; mercury from hydrochloric acid solutions; or iron, zinc and copper from HCl solutions; where the extracted species is eluted from the polymeric extraction agent, and thus recovered, while the extraction agent is regenerated for subsequent further use.

5. A process according to claim 1, wherein the extraction agent is dihexyldiethylene glycol and the extacted species is gold from hydrochloric acid.

6. A process according to claim 1, wherein the extracted species is cuprous ions, which are separated from iron, zinc, nickel, and cobalt, and the solution is a solution thereof in sulfuric acid of pH 1 to 5, and the extraction agent is a compound of group (b) defined in claim 1.

7. A process according to claim 1, wherein the extraction agent is a compound of group (c) defined in claim 1, and the extracted species is gold or uranium, the extraction being effected from solutions of gold in hydrochloric acid or nitric acid, and of uranium from the same acids.

8. A process according to claim 7, wherein the extracted species is stripped from the extraction agent by water.

9. A process according to claim 1, wherein said extraction agent is a compound of group (b) or group (c), defined in claim 1, impregnated into a solid support comprising macroporous polystyrene.

10. A process according to claim 1 further including the step of eluting said constituent from said extraction agent, thus recovering the extraction agent for further use.

11. A process according to claim 1 wherein R and R' designate a polymeric backbone or a group as defined under (a), (b), or (c), at least one of R and R' being a polymeric backbone.

12. A process according to claim 11 wherein the constituent being removed is a heavy metal cation.

* * * * *